(12) United States Patent
Golembiowski

(10) Patent No.: US 9,626,749 B2
(45) Date of Patent: Apr. 18, 2017

(54) SUB-PIXEL MODIFICATION OF DIGITAL IMAGES BY LOCALLY SHIFTING TO AN ARBITRARILY DENSE SUPERGRID

(71) Applicant: Intel Corporation, Santa Clara, CA (US)

(72) Inventor: Albert Golembiowski, Santa Monica, CA (US)

(73) Assignee: Intel Corporation, Santa Clara, CA (US)

(*) Notice: Subject to any disclaimer, the term of this patent is extended or adjusted under 35 U.S.C. 154(b) by 23 days.

(21) Appl. No.: 14/565,502

(22) Filed: Dec. 10, 2014

(65) Prior Publication Data
US 2016/0171673 A1    Jun. 16, 2016

(51) Int. Cl.
*G06T 5/20* (2006.01)
*G06T 5/00* (2006.01)

(52) U.S. Cl.
CPC ............... *G06T 5/20* (2013.01); *G06T 5/002* (2013.01)

(58) Field of Classification Search
CPC ............ G06T 5/20; G06T 2207/20024; G06T 2207/20012; G06T 2207/10008; G06T 3/4023; G06T 3/4053; G06T 5/002; G06T 5/003; H04N 5/23248; H04N 5/23254; H04N 5/23267; H04N 5/345; H03H 17/0202
USPC ......................................................... 382/261
See application file for complete search history.

(56) References Cited

U.S. PATENT DOCUMENTS

| | | |
|---|---|---|
| 6,189,105 B1 | 2/2001 | Lopes |
| 7,378,939 B2 | 5/2008 | Sengupta et al. |
| 7,757,070 B1 | 7/2010 | Kang et al. |
| 7,792,544 B2 | 9/2010 | Vogedes et al. |
| 8,737,759 B2 | 5/2014 | Golembiowski |
| 2004/0158594 A1 | 8/2004 | Acharya |
| 2005/0182803 A1 | 8/2005 | Claassen et al. |
| 2005/0193144 A1 | 9/2005 | Hassan et al. |
| 2005/0201637 A1* | 9/2005 | Schuler ................. G06T 3/4053 382/284 |
| 2006/0064695 A1 | 3/2006 | Burns et al. |
| 2006/0085847 A1 | 4/2006 | Ikeuchi et al. |
| 2008/0151308 A1 | 6/2008 | Frei |

FOREIGN PATENT DOCUMENTS

| | | |
|---|---|---|
| CN | 1655449 A | 8/2005 |
| WO | 2013006504 A3 | 2/2013 |

OTHER PUBLICATIONS

International Preliminary Report on Patentability received for PCT Application No. PCT/US2012/045140, mailed on Jan. 16, 2014, 7 pages.

(Continued)

*Primary Examiner* — Yon Couso
(74) *Attorney, Agent, or Firm* — Jordan IP Law, LLC

(57) ABSTRACT

Methods and systems may provide for receiving an input image having an input pixel density and defining a single filter based on a sub-pixel modification value, wherein the single filter has a working lattice density that is greater than the input pixel density. Additionally, the single filter and the input image may be used to generate an output image. In one example, defining the single filter includes converting the input pixel density to the working lattice density at an aperture level of the single filter.

24 Claims, 6 Drawing Sheets

(56) References Cited

OTHER PUBLICATIONS

International Search Report and Written Opinion received for PCT Application No. PCT/US2012/045140, mailed on Dec. 18, 2012, 11 pages.
Amit Bhatia et al. "Stacked Integral Image", 2010 IEEE International Conference on Robotics and Automation, May 3-8, 2010, 6 pages, Anchorage, Alaska.
European Office Action for European Patent Application No. 12807919.1, mailed Mar. 17, 2016, 5 pages.
European Search Report for EP Patent Application No. 12807919.1, mailed Apr. 9, 2015, 6 pages.
Shingo Kawada et al, "An Approach for Applying Large Filters on Large Images Using FPGA", International Conference on Field-Programmable Technology, 2007 IEEE, Dec. 1, 2007, 8 pages.

\* cited by examiner

SUB-PIXEL MODIFICATION OF DIGITAL IMAGES BY LOCALLY SHIFTING TO AN ARBITRARILY DENSE SUPERGRID

BACKGROUND

Image processing applications may add special effects such as blurring to video frame data in order to simulate the natural blur process of a camera lens or the depth of field effect associated with the human visual system. One approach to image blurring may involve the application of a filter to the pixels to the image to be blurred. High precision blurring, however, may be difficult to achieve due to limitations placed on conventional filtering solutions by the input and/or output pixel density of the image to be blurred. For example, sub-pixel (e.g., 2.5 pixel) blurring may involve the proportional mixing of multiple filters (e.g., one filter blurring at a two pixel density and another filter blurring at a three pixel density), which may lead to more complexity, increased power consumption and/or reduced battery life. Indeed, fractional (e.g., less than one pixel) sub-pixel blurring may not even be achievable under conventional approaches.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
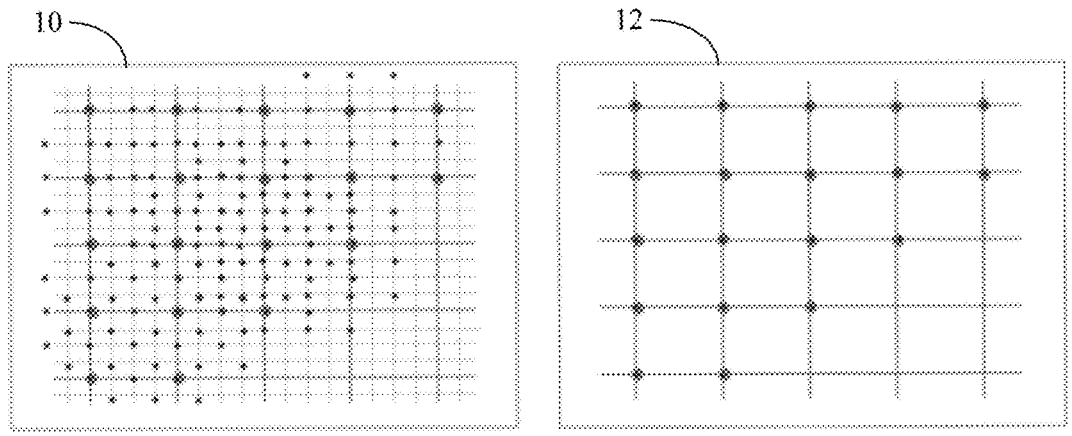
FIG. 1 is an illustration of an example of a filter lattice and an image pixel grid according to an embodiment.

FIG. 1 shows a filter lattice 10 corresponding to a single filter that may be used to modify at least a portion 12 of an input image. The input image may be associated with, for example, a video frame to which special effects such as blurring (e.g., to simulate natural depth of field effect of a camera lens), sharpening or other modifications are applied. The filter lattice 10 may generally have a working lattice density that is greater than the pixel density of the input image and the output image. For example, the illustrated portion 12 of the input image contains pixel information (e.g., image samples) at the locations of the large dots, whereas the illustrated filter lattice 10 is able to modify the input image at the locations of both the large dots and the small dots. Accordingly, the filter lattice 10 may be considered a "supergrid" to the extent that the working density of the filter lattice 10 is greater than the pixel density of the input image and/or output image. As will be discussed in greater detail, the filter lattice 10 may enable sub-pixel modifications, provide tighter/finer control over special effects and facilitate the use of a non-rectangular aperture (e.g., support region) for the filter. Indeed, the illustrated image sample positions of the image samples on the filter lattice 10 result in an arbitrarily-shaped aperture that may provide even greater control over the use of special effects.

Thus, shifting the domain of definition to a dense lattice—here shown as a factor of n=4 ($2^2$)—may improve accuracy. Since the thick-line grid has the original one-pixel spacing, the finer grid may allows controlling the blur amount in ¼ pixel increments. Hence, for example, a 3→2 blur radius transition may be conducted as 3→2.75→2.5→2.25→2 in the example shown, and with a filter kernel capable of significantly better approximating a disk filter (discussed in greater detail below) on a denser grid. The choice of the grid density factor n may be governed by how close to zero the blur amount is. In practice, a grid density of n=16 may be sufficient when moving below 1 pixel.

Figure 2:
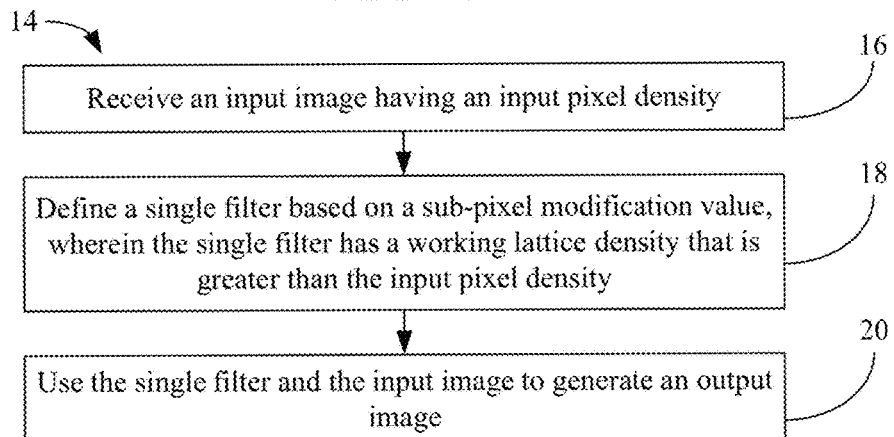
FIG. 2 is a flowchart of an example of a method of modifying an image according to an embodiment.

Turning now to FIG. 2, a method 14 of modifying an image is shown. The method 14 may be implemented as one or more modules in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 16 provides for receiving an input image having an input pixel density. The input pixel density may generally be a function of a predetermined resolution of image capture and image output processes. For example, some cameras might capture an image at a 4 k pixel resolution (e.g., using a 35 mm sensor) and provide a margin to output a relatively high quality image at a 2 k pixel resolution (e.g., for display in on a movie theater sized screen). A single filter may be defined at block 18 based on a sub-pixel (e.g., 2.5 pixel, less than one pixel) modification value (e.g., received as a special effect input), wherein the single filter has a working lattice density that is greater than the input pixel density.

As will be discussed in greater detail, block 18 may include converting the input pixel density to the lattice density at an aperture level of the single filter, which may minimize memory and/or processing resource usage. Moreover, block 18 may include convolving an interpolation filter with an approximation filter having a non-rectangular aperture. In one example, the interpolation filter and the approximation filter are two dimensional (2D) finite impulse response (FIR) filters. The sub-pixel modification value may be a blur value, a sharpening value, and so forth. Block 20 may use the single filter and the input image to generate an output image. As will be discussed in greater detail, block 20 may include computing only a zero phase portion of the single filter for the input image, which may further conserve processing resources.

Figure 3:
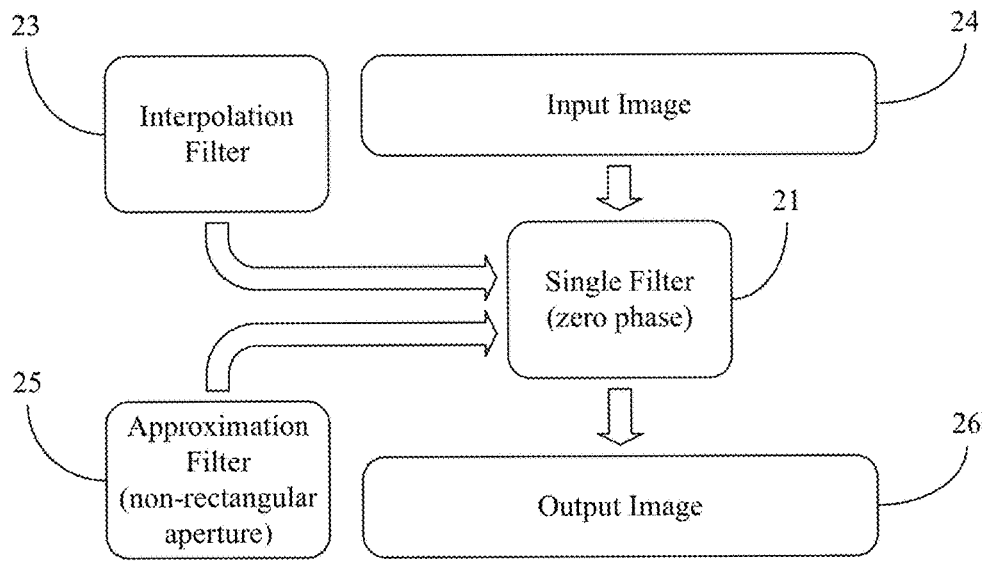
FIG. 3 is a block diagram of an example of a filter generation scenario according to an embodiment.

FIG. 3 shows a filter generation scenario in which an interpolation filter 21 is convolved with an approximation filter 25 having a non-rectangular aperture to obtain a single filter 21. In the illustrated example, the single filter 21 and an input image 24 are used to generate an output image 26. In one example, only a zero phase portion of the single filter 21 is computed for the input image 24. As already noted, the interpolation filter 21 and the approximation filter 25 may be 2D FIR filters.

Figure 4:
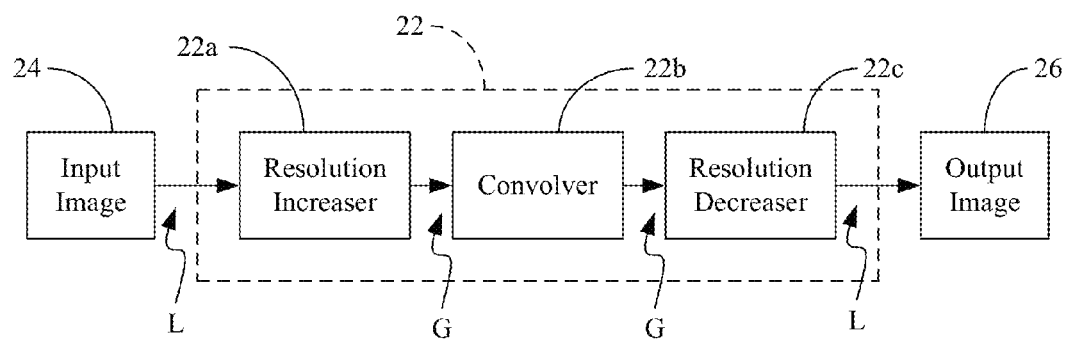
FIG. 4 is a block diagram of an example of a filter model according to an embodiment.

FIG. 4 shows an example of a model 22 (22a-22c) of the single filter 21 (FIG. 3) that may be used to convert the input image 24 into the output image 26. In the illustrated example, a resolution increaser 22a converts the image processing resolution from "L" to "G", wherein G is a denser lattice (e.g., supergrid having a boost factor of $n=2^k$) of which L is a sub-lattice. Additionally, a convolver 22b may convolve the input image 24 with a sub-pixel FIR filter "S" (the approximation filter), wherein a resolution decreaser 22c may convert the image processing resolution from G to L. The filter model 22 may operate as a single filter such as for example, the single filter 21. For example, a convolution equation that defines the FIR filtering process may be represented as demonstrated in the following convolution equation, $$v(x, y) = \sum_{j=u1}^{u2} \sum_{i=l1}^{l2} h(i, j)u(x - i, y - j) \quad (1)$$

where x, y, i and j are integers identifying rectangular grid locations, u and v are the input and output image pixel values, respectively, defined on a rectangular grid (e.g., sampling lattice), and h is the response of a non-separable FIR filter defined over a region inscribed within a grid rectangle (i.e., l1:l2, u1:u2). By selectively setting filter samples within the grid rectangle to zero, a filter aperture of arbitrary (e.g., non-rectangular) shape may be defined.

Figure 5A:
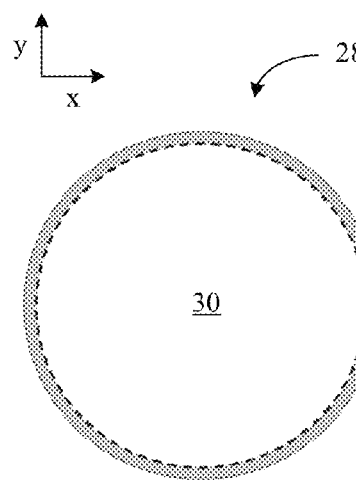
FIG. 5A is a two-dimensional (2D) top view of an example of a finite impulse response filter model according to an embodiment.
Figure 5B:
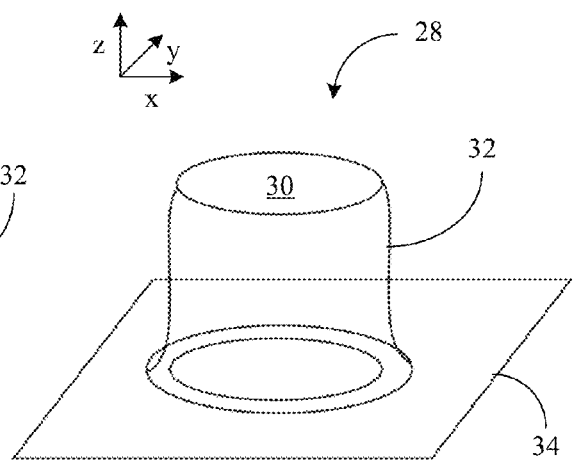
FIG. 5B is a three-dimensional (3D) perspective view of the FIR filter model shown in FIG. 5A.

FIGS. 5A and 5B, show a model 28 of an arbitrarily-shaped FIR kernel/filter in which the x- and y-axes represent the 2D sampling lattice pixel neighborhood, and the z-axis represents the values of filter samples that collectively determine the amount of blur to be applied to the pixels of an image. The shape of the filter aperture (e.g., support region, filter profile, etc.) could be circular, elliptical, kidney-shaped, arbitrary, and so forth. In the illustrated example, the FIR filter includes a constant-value (e.g., constant response, flat, etc.) region 30 where all pixels are modified (e.g., blurred, sharpened) with same-value filter samples, and a non-constant periphery band 32 where the filter samples taper off to a value of zero. Although the illustrated approximation FIR filter has the substantially flat response profile of a "mesa FIR filter" (e.g., termed after the shape of a mesa mountain), this condition is not necessary. As will be discussed in greater detail, the circular aperture of the illustrated FIR filter enables the filter to simulate real world visual phenomena such as the optical response of a camera lens or the human visual system. Thus, the convolution equation (1) above, the filter samples lying on a plane 34 may be set to zero to obtain the circular aperture shown.

In order to implement equation (1), the input image may be moved to the super-lattice G. This process, known as interpolation, may fill in missing values at the G lattice loci (e.g., image samples illustrated as small dots in FIG. 1) from the original image values at L lattice loci (e.g., image samples illustrated as large dots in FIG. 1). Although the interpolation process may not add information (e.g., add image detail), it may add noise or smear information. Accordingly, a high quality interpolation filter may be chosen. One type of such a filter is an information preserving (discussed in greater detail below with respect to FIG. 6), where the original pixel values (e.g., image samples illustrated as large dots in FIG. 1) do not change. The convolution process with the approximation filter performed in the G super-lattice, however, may change those pixel values.

Figure 6:
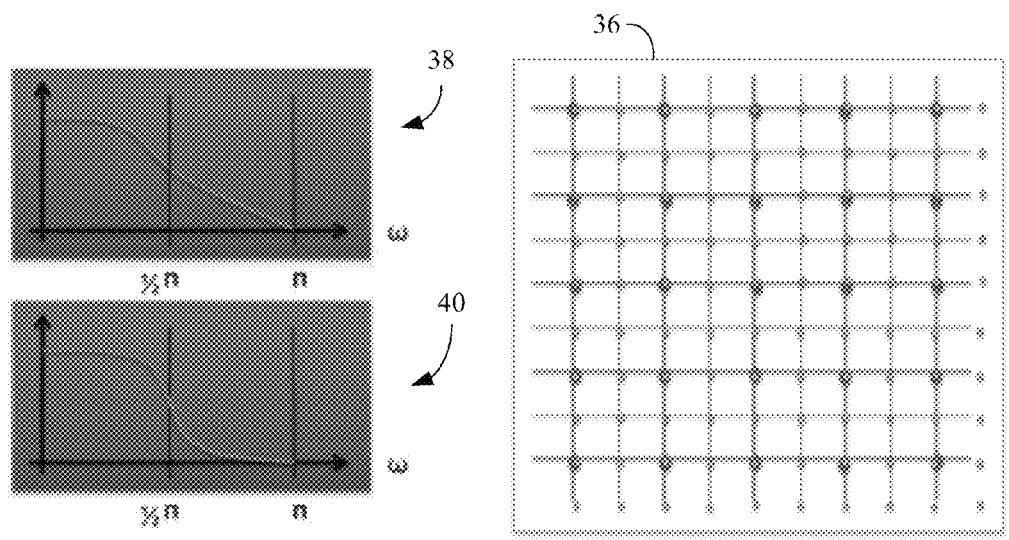
FIGS. 6 and 7 are illustrations of an example of a dyadic interpolation process according to an embodiment.

FIG. 6 demonstrates that the interpolation process to an arbitrary $n=2^k$ denser grid ("up-resolution") can be accomplished, logically, as a cascade of (dyadic) interpolations where density doubles at each stage. In particular, a dyadic interpolation process is shown in which a lattice 36 (e.g., lattice "L" represented by thicker lines) is doubled (e.g., n=2) in density in both the horizontal and vertical dimensions. The result of the dyadic interpolation process may be a supergrid (e.g., lattice "G1" represented by both thicker and thinner lines). Missing sub-pixels in lattice G1 may be initially set to zero (e.g., zero-filling/insertion), then computed in a convolution process with an interpolation filter operating in lattice G1.

One type of interpolation filter that may be well suited for each dyadic cascade is a half-band filter. Half-band filters, also known as a particular implementation of separable discrete wavelets, may minimize the resolution loss due to the low-pass pre-filtering involved in controlling aliasing that may be inherent in the final image sub-sampling process ("down-resolution"). The up-resolution cascade of dyadic interpolation is efficiently implemented by convolving the half-band filters at each stage, with the final filter's domain being moved to the final G lattice. Example interpolation filters include, for example, a frequency response 38 of a simple information preserving interpolation filter (e.g., with the values 1, 0.5), a frequency response 40 of a more complex half-band interpolation filter (e.g., with the values 0.5, 0.317733, 0, −0.103726, 0, 0.0588145, 0, −0.0395748, 0, 0.0284788, 0, −0.0188112, 0, 0.01517, 0, −0.00980152, 0, 0.00791724, 0, −0.00597753), and so forth.

Figure 7:
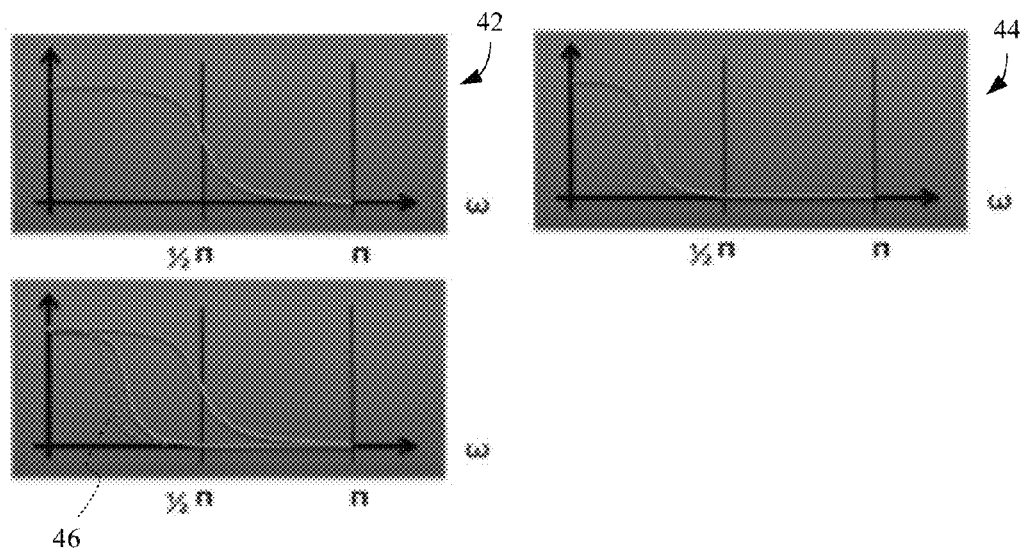

FIG. 7 shows a dyadic dilation of a prototype (i.e., scale) interpolation filter. In the illustrated example, a frequency response 42 of a scale filter defined in lattice G1 may undergo zero-filling to obtain a frequency response 44 of a zero-filled filter. The scale filter may be convolved with the zero-filled filter to obtain a combined frequency response 46. Thus, the interpolated input image defined on the final supergrid "G" may be obtained by cascaded dyadic filtering L→G1→G2→ . . . →G.

The final interpolation two-dimensional (2D) filter may be implemented as separable by means of 1D dyadic half-band filters as illustrated earlier or may be of a more general 2D non-separable information-preserving high-quality type filter. The final interpolation 2D filter may then be convolved with, for example, a disk-approximating filter "S", resulting in a single 2D non-separable filter "F" operating in the super-lattice G. Since most of the G lattice output image samples may be discarded in the G→L sub-sampling stage, an efficient implementation may be to not compute the discarded pixels by using only the zero-phase "Z" part of the filter F. Theoretically, the response of filter F, defined on G, may be equivalent to the sum of all of its polyphase components, each existing on a G:L coset. All except the zero-phase polyphase component, existing on L, may produce discarded output pixels. Of particular note is that Z may exist in L and represent an efficient compaction of the three stages subsumed by the filter model 22 (FIG. 4).

Figure 8:
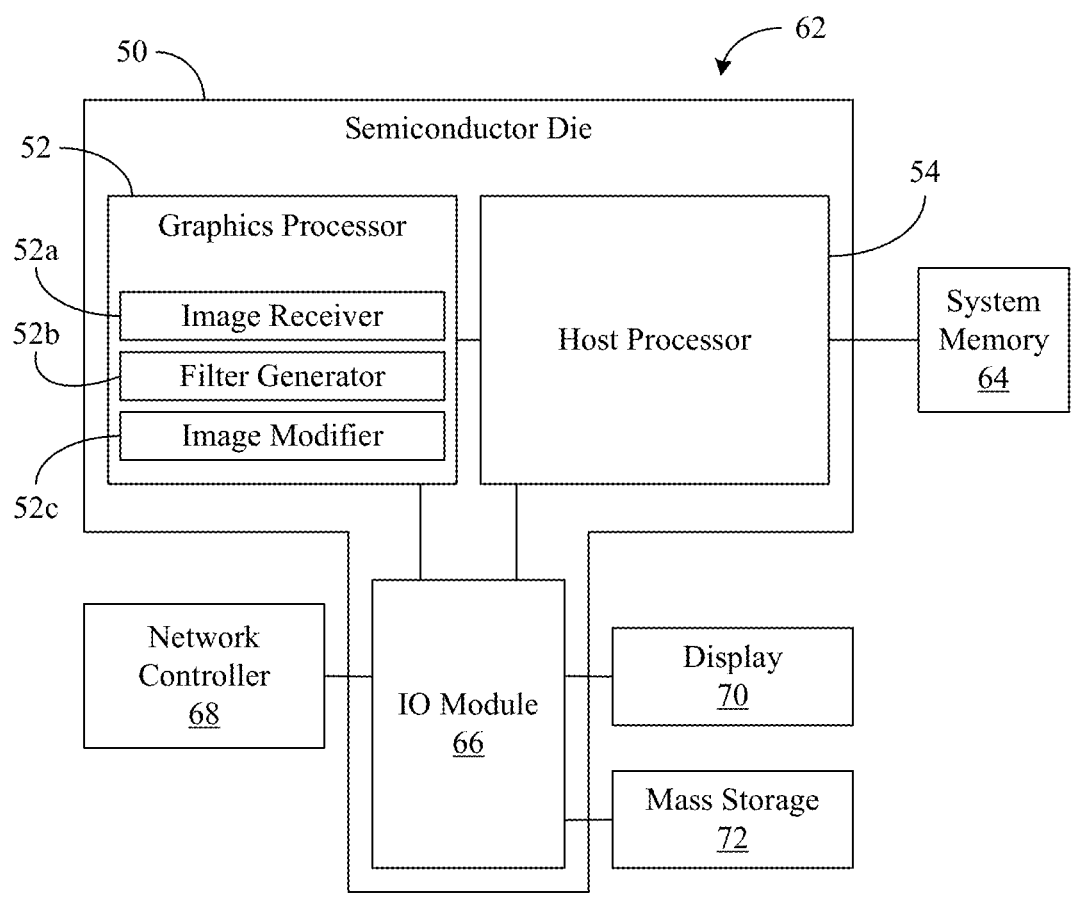
FIG. 8 is a block diagram of an example of an image display system according to an embodiment.

Turning now to FIG. 8, a computing system 62 is shown, wherein the system 62 may be part of a mobile platform such as a laptop, mobile Internet device (MID), personal digital assistant (PDA), media player, imaging device, wearable computer, etc., any smart device such as a smart phone, smart tablet, smart TV (television) and so forth, or any combination thereof. The system 62 may also be part of a fixed platform such as a personal computer (PC), server, workstation, etc. The illustrated system 62 includes one or more memory devices such as, for example, system memory 64 and/or mass storage 72, wherein the memory device may store input images having an input pixel density. The system 62 may also include a semiconductor die 50 having a host processor 54 (e.g., central processing unit/CPU) with an integrated memory controller (iMC, not shown) that provides access to the system memory 64, which may include, for example, double data rate (DDR) synchronous dynamic random access memory (SDRAM, e.g., DDR3 SDRAM JEDEC Standard JESD79-3C, April 2008) modules. The modules of the system memory 64 may be incorporated, for example, into a single inline memory module (SIMM), dual inline memory module (DIMM), small outline DIMM (SODIMM), and so on.

The semiconductor die 50 may also include a graphics processor 52 (52a-52c) integrated into the semiconductor die 50 (e.g., in a system on chip/SoC configuration) along with the host processor 54 and an input/output (IO) module 66, wherein the illustrated graphics processor 52 generally modifies the input images in order to achieve various special effects. More particularly, the graphics processor 52 may include an image receiver 52a to receive input images and a filter generator 52b to define a single filter based on a sub-pixel modification value, wherein the single filter is to have a lattice density that is greater than the input pixel density. In one example, the filter generator 52b converts the input pixel density to the lattice density at an aperture level of the single filter. Additionally, the filter generator 52b may convolve an interpolation filter with an approximation filter having a non-rectangular aperture to obtain the single filter. In such a case, the interpolation filter and the approximation filter may be 2D FIR filters. The illustrated graphics processor 52 also includes an image modifier 52c to use the single filter and the input images to generate output images. The image modifier 52c may compute only a zero phase portion of the single filter. Additionally, the sub-pixel modification value may be a sub-pixel blur value.

The host processor 54 may also include one or more processor cores (not shown), where each core may be fully functional with instruction fetch units, instruction decoders, level one (L1) cache, execution units, and so on. The host processor 54 may alternatively communicate with an off-chip variation of the iMC, also known as a Northbridge, via a front side bus or a point-to-point fabric that interconnects each of the components in the system 62. The host processor 54 may also execute an operating system (OS, not shown).

The illustrated host processor 54 communicates with the IO module 66, also known as a Southbridge, via a bus. The iMC/host processor 54 and the IO module 66 are sometimes referred to as a chipset. The host processor 54 may also be operatively connected to a network (not shown) via a network port through the IO module 66 and a network controller 68. Thus, the network controller 68 may provide off-platform communication functionality for a wide variety of purposes such as wired communication or wireless communication including, but not limited to, cellular telephone (e.g., Wideband Code Division Multiple Access, W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/IEEE 802.11, 2007 Edition), Bluetooth (e.g., IEEE 802.15.1-2005, Wireless Personal Area Networks), WiMax (e.g., IEEE 802.16-2004), Global Positioning System (GPS), spread spectrum (e.g., 900 MHz), and other radio frequency (RF) telephony purposes. The IO module 66 may also communicate with a display 70 to provide for the visual output/presentation of video, images, and other content. The network controller 68 may communicate with the IO module 66 to provide support for user interface devices (not shown) such as a keypad, mouse, etc., in order to allow a user to interact with and perceive information from the system 62.

The IO module 66 may also have internal controllers (not shown) such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated 10 module 66 is also coupled to the mass storage 72, which may include a hard drive, read only memory (ROM), optical disk, flash memory, etc.

The graphics processor 52 may alternatively be coupled to a dedicated graphics memory (not shown), wherein the dedicated graphics memory may include, for example, GDDR (graphics DDR) or DDR SDRAM modules, or any other memory technology suitable for supporting graphics rendering. The graphics processor 52 and graphics memory might also be installed on a graphics/video card, wherein the graphics processor 52 may communicate with the host processor 54 via a graphics bus such as a PCI Express Graphics (PEG, e.g., Peripheral Components Interconnect/PCI Express x16 Graphics 150 W-ATX Specification 1.0, PCI Special Interest Group) bus, or Accelerated Graphics Port (e.g., AGP V3.0 Interface Specification, September 2002) bus. The graphics card and/or graphics processor 52 may be integrated onto a system motherboard, configured as a discrete card on the motherboard, etc. Below is an example of pseudo code to perform the image modification operations of the graphics processors (with the method ".dyadic_dilate( )" performing the up-resolution cascade of dyadic interpolation).

```
// ---------------- definition --------------------------------
Filter2D generate_disk_filter(float Radius)
{
    // raster scan a zero-centered square region on a 2D grid
    // and set samples within 2D Radius to 1, else to 0
}
// ----------------func: construct zero-phase 2D non-separable filter ---------------
Filter2D   compute_zero_phase_filter(float   Radius,   int   Grid_density_power,
Filter1D Scale)
{
    int density_factor = 2^Grid_density_power;
```

```
            float radius = Radius * density_factor;
            Filter2D zero_phase_filter, disk = generate_disk_filter(radius);
            Filter1D out_filter = Scale, scale_filter = Scale;
            for    (int    grid_density_factor    =    1;    grid_density_factor    <
Grid_density_power; grid_density_factor++)
            {
               scale_filter.dyadic_dilate( );
               out_filter *= scale_filter;        // 1D convolution
            }
            Filter2d filter = disk * out_filter     // 2D * 1D convolution
            filter.sub_sample(density_factor);   // pick filter samples on a sub-lattice
and sub-sample
            return filter;
         }
         // ----------- invocation -----------------------
         float radius = RAD_VALUE;
         int grid_density_power = grid_look_up_table(radius);
         Filter1D scale_filter = SCALE_FILTER;
         Image2D u, v;
         u.read(path/name);              // read in input 2D image
         Filter2D filter2d = compute_zero_phase_filter (radius, grid_density_power,
scale_filter);
            v = u * filter2d;            // compute output image by 2D convolution
```

Figure 9:
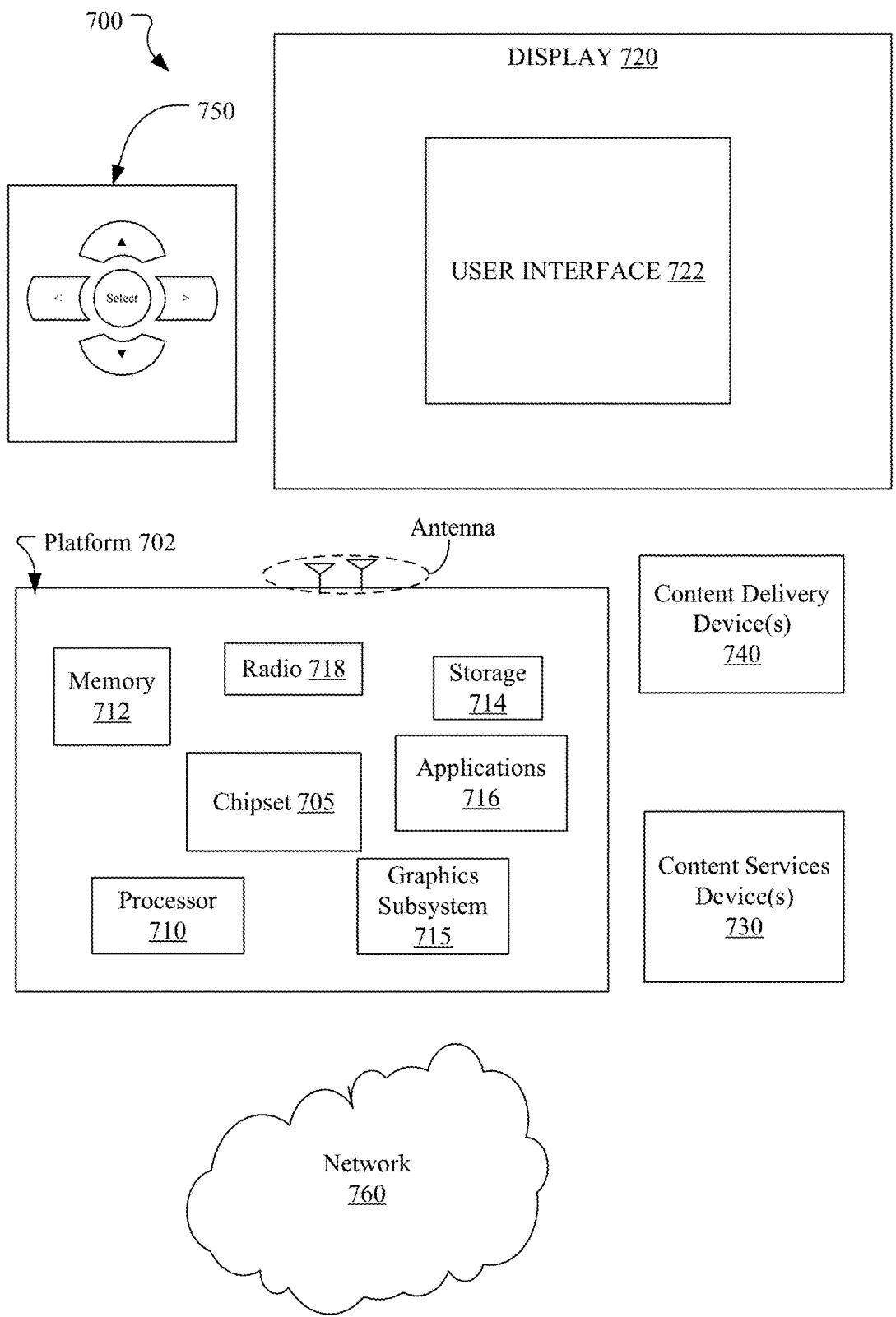
FIG. 9 is a block diagram of an example of a system having a navigation controller according to an embodiment.

FIG. 9 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to conduct view interpolation as described herein.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface, DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog.

In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
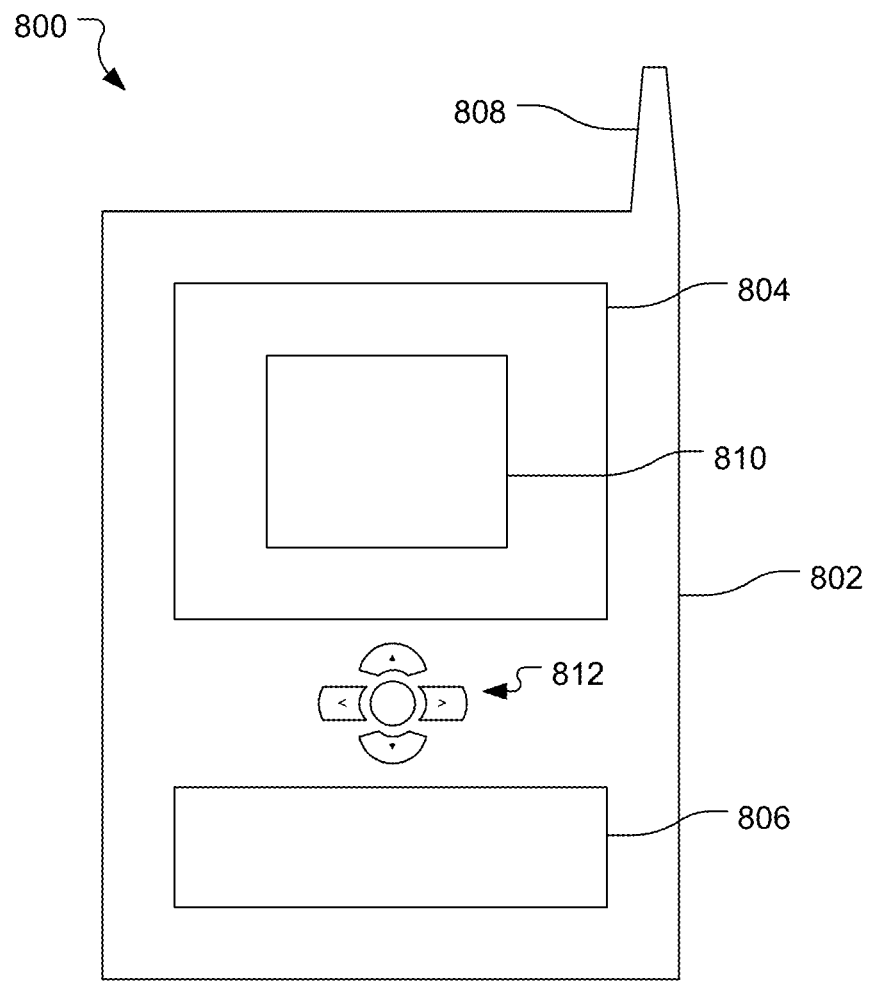
FIG. 10 is a block diagram of an example of a system having a small form factor according to an embodiment.

As described above, the system 700 may be embodied in varying physical styles or form factors. FIG. 10 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

ADDITIONAL NOTES AND EXAMPLES

Example 1 may include an image display system comprising a memory device to store an input image having an input image pixel density, a processor including an image receiver to receive the input image, a filter generator to define a single filter based on a sub-pixel modification value, wherein the single filter is to have a working lattice density that is greater than the input pixel density, and an image modifier to use the single filter and the input image to generate an output image. The image display system may also comprise a display device to visually present the output image.

Example 2 may include the system of Example 1, wherein the filter generator is to convert the input pixel density to the working lattice density at an aperture level of the single filter.

Example 3 may include the system of Example 1, wherein the filter generator is to convolve an interpolation filter with an approximation filter having a non-rectangular aperture.

Example 4 may include the system of Example 3, wherein the interpolation filter and the approximation filter are to be two dimensional finite impulse response (FIR) filters.

Example 5 may include the system of Example 1, wherein the image modifier is to compute only a zero phase portion of the single filter.

Example 6 may include the system of any one of Examples 1 to 5, wherein the sub-pixel modification value is to be a sub-pixel blur value.

Example 7 may include an image modification apparatus comprising an image receiver to receive an input image having an input pixel density, a filter generator to define a single filter based on a sub-pixel modification value, wherein the single filter is to have a working lattice density that is greater than the input pixel density, and an image modifier to use the single filter and the input image to generate an output image.

Example 8 may include the apparatus of Example 7, wherein the filter generator is to convert the input pixel density to the working lattice density at an aperture level of the single filter.

Example 9 may include the apparatus of Example 7, wherein the filter generator is to convolve an interpolation filter with an approximation filter having a non-rectangular aperture.

Example 10 may include the apparatus of Example 9, wherein the interpolation filter and the approximation filter are to be two dimensional finite impulse response (FIR) filters.

Example 11 may include the apparatus of Example 7, wherein the image modifier is to compute only a zero phase portion of the single filter.

Example 12 may include the apparatus of any one of Examples 7 to 11, wherein the sub-pixel modification value is to be a sub-pixel blur value.

Example 13 may include a method of modifying images, comprising receiving an input image having an input pixel density, defining a single filter based on a sub-pixel modification value, wherein the single filter has a working lattice density that is greater than the input pixel density, and using the single filter and the input image to generate an output image.

Example 14 may include the method of Example 13, wherein defining the single filter includes converting the input pixel density to the working lattice density at an aperture level of the single filter.

Example 15 may include the method of Example 13, wherein defining the single filter includes convolving an interpolation filter with an approximation filter having a non-rectangular aperture.

Example 16 may include the method of Example 15, wherein the interpolation filter and the approximation filter are two dimensional finite impulse response (FIR) filters.

Example 17 may include the method of Example 13, wherein using the single filter to generate the output image includes computing only a zero phase portion of the single filter for the input image.

Example 18 may include the method of any one of Examples 13 to 17, wherein the sub-pixel modification value is a sub-pixel blur value.

Example 19 may include at least one computer readable storage medium comprising a set of instructions which, when executed by a computing device, cause the computing device to receive an input image having an input pixel density, define a single filter based on a sub-pixel modification value, wherein the single filter is to have a working lattice density that is greater than the input pixel density, and use the single filter and the input image to generate an output image.

Example 20 may include the at least one computer readable storage medium of Example 19, wherein the instructions, when executed, cause a computing device to convert the input pixel density to the working lattice density at an aperture level of the single filter.

Example 21 may include the at least one computer readable storage medium of Example 19, wherein the instructions, when executed, cause a computing device to convolve an interpolation filter with an approximation filter having a non-rectangular aperture.

Example 22 may include the at least one computer readable storage medium of Example 21, wherein the interpolation filter and the approximation filter are to be two dimensional finite impulse response (FIR) filters.

Example 23 may include the at least one computer readable storage medium of Example 19, wherein the instructions, when executed, cause a computing device to compute only a zero phase portion of the single filter for the input image.

Example 24 may include the at least one computer readable storage medium of any one of Examples 19 to 23, wherein the sub-pixel modification value is to be a sub-pixel blur value.

Example 25 may include an image modification apparatus comprising means for receiving an input image having an input pixel density; means for defining a single filter based on a sub-pixel modification value, wherein the single filter has a working lattice density that is greater than the input pixel density; and means for using the single filter and the input image to generate an output image.

Example 26 may include the apparatus of Example 25, wherein the means for defining the single filter includes means for converting the input pixel density to the working lattice density at an aperture level of the single filter.

Example 27 may include the apparatus of Example 25, wherein the means for defining the single filter includes means for convolving an interpolation filter with an approximation filter having a non-rectangular aperture.

Example 28 may include the apparatus of Example 27, wherein the interpolation filter and the approximation filter are to be two dimensional finite impulse response (FIR) filters.

Techniques may provide a methodology of managing resolution shifts by controlling only a few parameters of three distinct stages of the process, while also presenting an implementation that combines the three stages into a single use of a zero-phase polyphase FIR response that maximizes speed and reduces up-resolution memory expansion to a small local increase of the effective filter aperture. Techniques may apply to a wide range of applications using non-separable FIR blurring at a fine sub-pixel level. Techniques may also provide independent software vendors in image processing/video effects/video game markets with access to a general blurring functionality having exceptional performance and covering sub-pixel ranges near a zero blur radius. The techniques may be tuned to current and the next generation processor instruction set architectures, resulting in potentially the fastest blur functionality available.

In addition, techniques may provide a quality 2D non-separable blurring in sub-pixel domain within the film visual effects industry, video game industry, medical imagery and others. Techniques may also provide accurate modeling of natural processes such as depth-blurring by a camera lens, as well as the pre-filtering that takes place in perceived resolution change in the human vision system. Real-time response not only realizes efficiencies in production pipelines, but may also substantially improves the workflow of a digital artist.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

I claim:

1. A system comprising:
   a memory device to store an input image having an input pixel density;
   a processor including,
      an image receiver to receive the input image,
      a filter generator to define a single filter based on a sub-pixel modification value, wherein the single filter forms a lattice grid having a first set of grid lines spaced one pixel apart and a second set of grid lines within the first set of grid lines, wherein the second set of grid lines are spaced at a fine density at the sub-pixel level and provide a working lattice density that is greater than the input pixel density, and
      an image modifier to use the single filter and the input image to generate an output image, wherein the image sub-pixel modification value is a sub-pixel blur value; and
   a display device to visually present the output image.

2. The system of claim 1, wherein the filter generator is to convert the input pixel density to the working lattice density at an aperture level of the single filter.

3. The system of claim 1, wherein the filter generator is to convolve an interpolation filter with an approximation filter having a non-rectangular aperture.

4. The system of claim 3, wherein the interpolation filter and the approximation filter are to be two dimensional finite impulse response (FIR) filters.

5. The system of claim 1, wherein the image modifier is to compute only a zero phase portion of the single filter.

6. The system of claim 1, wherein the sub-pixel modification value is to be a sub-pixel blur value.

7. An apparatus comprising:
   an image receiver to receive an input image having an input pixel density;
   a filter generator to define a single filter based on a sub-pixel modification value, wherein the single filter forms a lattice grid having a first set of grid lines spaced one pixel apart and a second set of grid lines within the first set of grid lines, wherein the second set of grid lines are spaced at a fine density at the sub-pixel level and provide a working lattice density that is greater than the input pixel density; and
   an image modifier to use the single filter and the input image to generate an output image, wherein the image sub-pixel modification value is a sub-pixel blur value.

8. The apparatus of claim 7, wherein the filter generator is to convert the input pixel density to the working lattice density at an aperture level of the single filter.

9. The apparatus of claim 7, wherein the filter generator is to convolve an interpolation filter with an approximation filter having a non-rectangular aperture.

10. The apparatus of claim 9, wherein the interpolation filter and the approximation filter are to be two dimensional finite impulse response (FIR) filters.

11. The apparatus of claim 7, wherein the image modifier is to compute only a zero phase portion of the single filter.

12. The apparatus of claim 7, wherein the sub-pixel modification value is to be a sub-pixel blur value.

13. A method comprising:
   receiving an input image having an input pixel density;
   defining a single filter based on a sub-pixel modification value, wherein the single filter forms a lattice grid having a first set of grid lines spaced one pixel apart and a second set of grid lines within the first set of grid lines, wherein the second set of grid lines are spaced at a fine density at the sub-pixel level and provide working lattice density that is greater than the input pixel density; and using the single filter and the input image to generate an output image, wherein the image sub-pixel modification value is a sub-pixel blur value.

14. The method of claim 13, wherein defining the single filter includes converting the input pixel density to the working lattice density at an aperture level of the single filter.

15. The method of claim 13, wherein defining the single filter includes convolving an interpolation filter with an approximation filter having a non-rectangular aperture.

16. The method of claim 15, wherein the interpolation filter and the approximation filter are two dimensional finite impulse response (FIR) filters.

17. The method of claim 13, wherein using the single filter to generate the output image includes computing only a zero phase portion of the single filter for the input image.

18. The method of claim 13, wherein the sub-pixel modification value is a sub-pixel blur value.

19. At least one non-transitory computer readable storage medium comprising a set of instructions which, when executed by a computing device, cause the computing device to:

receive an input image having an input pixel density;

define a single filter based on a sub-pixel modification value, wherein the single filter forms a lattice grid having a first set of grid lines spaced one pixel apart and a second set of grid lines within the first set of grid lines, wherein the second set of grid lines are spaced at a fine density at the sub-pixel level and provide a working lattice density that is greater than the input pixel density; and use the single filter and the input image to generate an output image, wherein the image sub-pixel modification value is a sub-pixel blur value.

20. The at least one non-transitory computer readable storage medium of claim 19, wherein the instructions, when executed, cause a computing device to convert the input pixel density to the working lattice density at an aperture level of the single filter.

21. The at least one non-transitory computer readable storage medium of claim 19, wherein the instructions, when executed, cause a computing device to convolve an interpolation filter with an approximation filter having a non-rectangular aperture.

22. The at least one non-transitory computer readable storage medium of claim 21, wherein the interpolation filter and the approximation filter are to be two dimensional finite impulse response (FIR) filters.

23. The at least one non-transitory computer readable storage medium of claim 19, wherein the instructions, when executed, cause a computing device to compute only a zero phase portion of the single filter for the input image.

24. The at least one non-transitory computer readable storage medium of claim 19, wherein the sub-pixel modification value is to be a sub-pixel blur value.

* * * * *